Oct. 19, 1971   R. L. SCOTT   3,613,451
MASS FLOWMETER
Filed Oct. 24, 1969

INVENTOR.
RICHEY L. SCOTT
BY *William N. Antonis*
ATTORNEY

United States Patent Office 3,613,451
Patented Oct. 19, 1971

3,613,451
MASS FLOWMETER
Richey L. Scott, Davenport, Iowa, assignor to
The Bendix Corporation
Filed Oct. 24, 1969, Ser. No. 869,152
Int. Cl. G01f 3/00; F04d 29/18
U.S. Cl. 73—231 M 3 Claims

ABSTRACT OF THE DISCLOSURE

A flowmeter which operates on a time-base angular-momentum principle to provide accurate time-mass gaging of fluid streams of varying density and viscosity. The flowmeter includes a rotatable drive turbine and a rotatable reaction turbine which is mechanically coupled to the drive turbine through a linear spiral spring which causes the reaction turbine to lag the drive turbine by a lag angle which when measured on a time-base produces a signal which is proportional to the mass flow rate of the fluid stream. The drive turbine includes a plurality of bypass openings which permit flow of the fluid stream therethrough and is provided with a plurality of variable angle turbine blades which are disposed adjacent the bypass openings to progressively permit increased flow through the bypass openings when the pressure drop across the drive turbine exceeds a predetermined value.

BACKGROUND OF THE INVENTION

The device described hereinafter in more detail relates to the time-base method of mass flow rate measurement. The time-base method is so-called because the output signal is a pulse, the duration of which is proportional to the mass flow rate. This is accomplished through the use of a reaction turbine which is driven at some angular velocity by a motor or a secondary turbine which derives its power from the fluid itself. The fluid enters the reaction turbine after being passed through a set of straightening vanes and then is accelerated by the reaction turbine to the angular velocity of the turbine. The torque thus induced on the turbine by the fluid is proportional to the mass flow rate times the angular velocity of the reaction turbine. If the reaction turbine is coupled to the driving mechanism by means of a spiral spring, then the reaction turbine will lag behind the driving mechanism by an angle which varies directly with the induced torque. It is known that, if a fixed point on the driving mechanism and a fixed point on the reaction turbine are so aligned such that the included angle between them is zero for zero flow, the elapsed time between the passage of the first point and the passage of the second point past a fixed point on the flowmeter housing will be directly proportional to the mass flow rate and independent of the drive turbine velocity.

In order to minimize possible errors and to simplify the function which must be carried out by the signal conditioner, it has been found that it is desirable to maintain a relatively constant angular velocity for the drive turbine throughout the flow range. An electric motor could provide this type of drive, but is otherwise impractical since it adds undesirable weight and must be well isolated from the fluid. If a secondary turbine is to drive the reaction turbine, then some means must be utilized which will provide the preferred angular velocity for the secondary turbine at the lowest possible flow rate and will maintain this velocity throughout the total range of flow.

SUMMARY OF THE INVENTION

Accordingly, it is an object of this invention to provide a flowmeter of the type described which will accomplish the foregoing functions.

An important object of this invention is to provide a mass flowmeter of the type described wherein the drive turbine includes bypass opening means for permitting flow of the fluid stream therethrough and variable turbine blade means carried by the drive turbine and disposed adjacent to the bypass opening means for progressively increasing flow through the bypass opening means when the pressure drop across the drive turbine exceeds a predetermined value, said turbine blade means having an increased angular disposition with respect to said drive turbine as the flow rate increases.

More specifically, it is an object of this invention to provide a flowmeter of the type described which includes hinged valves or blades, which are mounted on the surface of a circular drive turbine plate, the surface of which is normal to the fluid stream flow axis, wherein the valves or blades control flow through the bypass openings which are located in the circular plate. The diameter of the plate is nearly as large as the diameter of the fluid passageway so that most of the fluid is required to pass through the bypass valve openings. The valves or blades are spring loaded so that their angle of opening is controlled by the pressure drop across the plate. A pretension is put on the springs so that the valves will not open until a certain differential fluid pressure occurs thereacross. In the flow region below this pressure, the fluid is allowed to escape through orifices which are formed on the end of the valve which is opposite the valve hinge, so that relatively high fluid velocities occur in this flow region and result in a maximum driving torque. Above the point where the fluid pressure overbalances the spring pretension, the valves begin to open, at which time they begin to act as turbine blades, the angular disposition of which, the respect to the turbine plate, increases with increasing flow rate. The valving arrangement is such that the fluid passageway is almost entirely open at maximum flow rate in order to produce a minimum restriction to flow. This represents a distinct advantage in applications involving aircraft fuel control systems in which pressure drop is at a premium.

Other objects, features and advantages of the invention will be apparent from the following description of the invention taken in connection with the accompanying drawings.

DESCRIPTION OF THE PREFERRED EMBODIMENT

Figure 1:
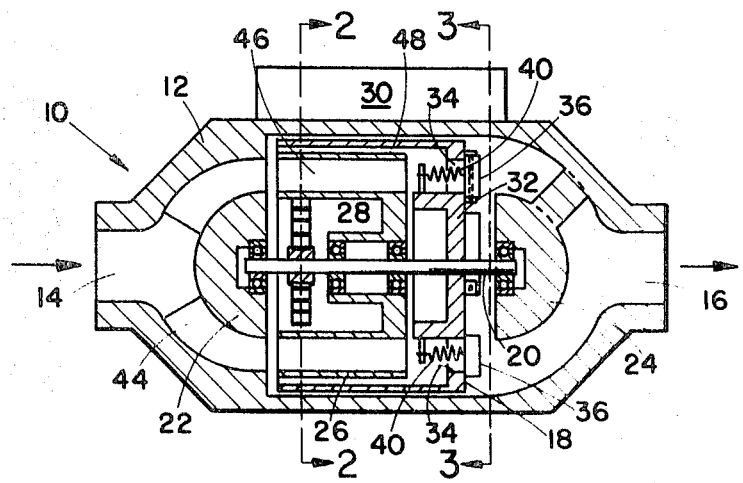
FIG. 1 is a longitudinal sectional view of a flowmeter which incorporates the invention.
Figure 2:
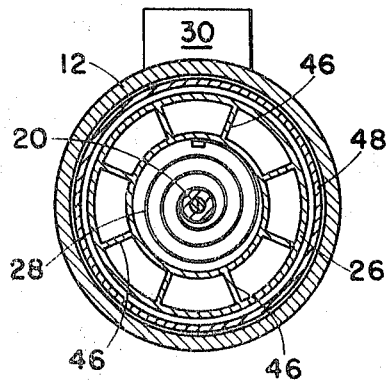
FIGS. 2 and 3 are sectional views taken along lines 2—2 and 3—3, respectively, of FIG. 1.
Figure 3:
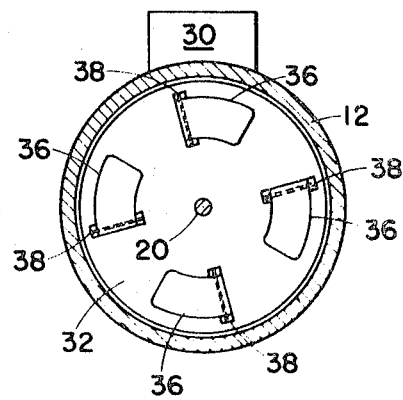

Referring to FIGS. 1–3, it will be seen that the flowmeter, indicated generally by the numeral 10, includes a housing 12 having an inlet port 14 and an outlet port 16. A drive turbine 18 is suitably attached to a shaft 20 which is rotatably supported by suitable bearings carried in spider type supports 22 and 24 located at opposite ends of the flowmeter. The term spider type supoprt is used herein to mean a support having openings through which fluid can flow. A reaction turbine 26 is rotatably mounted on shaft 20 through use of suitable bearings so that it can rotate relative thereto. A spiral spring 28 is suitably attached at its inner end to the shaft 20 and at its outer end to the reaction turbine 26. As a result, when the drive turbine 18 is rotated, the spring 28 will cause a similar rotation of the reaction turbine 26 at the same speed as the drive turbine 18, but at an angle which lags the drive turbine, hereinafter referred to as the "lag angle."

The magnitude of the lag angle is related to the speed of the fluid stream in the housing 12 and the mass of the fluid in the stream. In other words, as the speed of the stream or the fluid density is increased, the lag angle will increase due to the increased rate at which the reaction turbine must impart angular momentum to the fluid stream entering it. It can be mathematically shown, however, that the mass flow rate at a given time is proportional to the time lag between the drive turbine 18 and the reaction turbine 26. Thus, if one considers two points on the peripheries of the turbines 18 and 26 which are angularly aligned when the turbines are at rest, it can be shown that when there is significant fluid flow through the housing 12, the point on the reaction turbine will angularly lag the point on the drive turbine. Next, if one considers a fixed point on the housing 12, it can also be shown that during rotation of the turbine, a given time lapse will occur from the moment at which the point on the drive turbine 18 passes the fixed point on the housing to the moment at which the point on the reaction turbine passes the same fixed point on the housing. Expressed mathematically, this time lapse T, is directly related to the mass flow rate. Thus:

$$dm/dt = KT$$

where: K is a constant; and $dm/dt$ is the mass flow rate.

From the foregoing it can thus be seen that a measurement of time T will continually provide a measure of the mass flow rate irrespective of the speed of rotation of the drive turbine 18. The time T can be continually measured by any suitable unit 30 mounted on the housing 12 and electrically connected to a pickup circuit which transposes the time measurement into a reading on a gauge (not shown). The output signal of such an arrangement is a pulse the duration of which is proportional to the lag angle times the speed of rotation, and thus to the mass flow rate. The time-base pickup signal can be obtained through the use of angular rotation sensors on the drive turbine shroud and the reaction turbine. These sensors can be electrical switches which close as the turbine rotates. An optical unit for achieving such measurement is disclosed in copending patent appliction Ser. No. 807,-699, filed Mar. 17, 1969.

Figure 4:
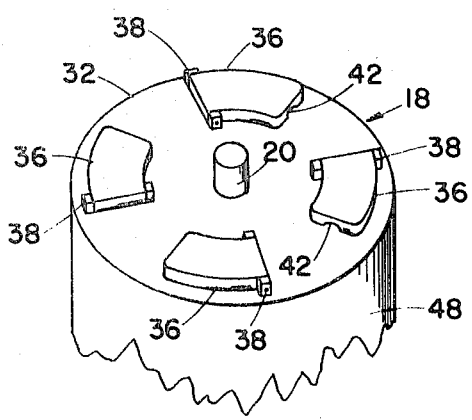
FIGS. 4 and 5 are fragmentary enlarged perspective views of a portion of the flowmeter which show the variable turbine blades of the drive turbine in a fully closed and a fully open position, respectively.
Figure 5:
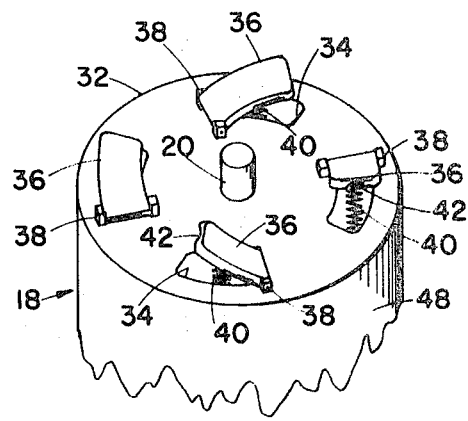

It will be noted from the drawing that the drive turbine 18 includes a plate 32 having a plurality of bypass openings 34 therein, radially located around the shaft 20, for permitting flow of fluid therethrough and a plurality of variable angle turbine blades 36 which are pivotally connected at one end 38 thereof so that they can progressively move from a fully closed position, as shown in FIGS. 1, 3 and 4, to a fully open position, as shown in FIG. 5, which will permit increased flow through the bypass openings. The turbine blades are urged towards their fully closed positions by springs 40, one end of which is operatively connected to the drive turbine and the other end of which is operatively connected to the turbine blades. In this arrangement the blades 36 perform a dual function. Firstly, they function as spring loaded valve members or plates, for controlling flow through the bypass openings, which do not open until a pressure differential of a predetermined value occurs thereacross. Secondly, after the valve plates open, the plates begin to function as turbine blades, the angles of which increase as the flow rate increases. At flows resulting in pressure differentials below the predetermined value which cause opening of the blades 36, fluid is allowed to escape through a small angular groove 42 in the bypass opening face of each turbine blade. The groove in effect provides an orifice between each blade and its associated bypass opening. If desired, the groove could be located on the turbine plate 32 at the edge of each bypass opening, instead of on the turbine blade, as shown.

Accordingly, operation of the flowmeter will be as follows: Fluid will enter the housing 12 through the inlet port 14 and will then flow through straightening vanes 44 which will eliminate any swirl or initial angular velocity therefrom. From the straightening vanes 44 the fluid will pass through the shrouded reaction turbine 26 which is rotating at some given speed. The reaction turbine includes straight vanes 46 of sufficient length to insure that all of the fluid entering the turbine is accelerated to the angular velocity of the turbine before flowing off therefrom. This insures that the torque required to accelerate the fluid is an exact function of the mass flow rate. A rotating shroud 48, which is connected to the drive turbine 18, eliminates fluid viscous coupling between the reaction turbine 26 and the housing 12. Fluid leakage between the reaction turbine, shroud, and housing is minimized by careful control of tolerances. Any leakage that does occur is substantially proportional to the mass flow rate, and does not represent a significant error source.

After the fluid is metered in the reaction turbine, it flows through the drive turbine which produces rotational torque through the use of the variable angle turbine blades 36 which initially, at relatively low flow rates, permit flow through the groove type orifices 42. As flow increases, the spring loaded turbine blades, which also function as bypass valves, open, as shown in FIG. 5, when the pressure drop across the drive turbine exceeds a predetermined value and progressively permit increased flow through the bypass opening 34. Although initially the turbine blades 36 simultaneously function as both valves and variable angle turbine blades, after the blades have opened to some given angle or greater, e.g. 45 degrees, they function only as variable angle turbine blades in the angular range above said given angle. By varying the orifice sizes, springs and location of spring attachments, a variety of turbine-speed vs. flow-rate curves can be produced.

The several practical advantages which flow from this invention are believed to be obvious from the foregoing description and other advantages may suggest themselves to those who are familiar with the art to which this invention relates.

Furthermore, although this invention has been described in connection with a specific embodiment, it will be obvious to those skilled in the art that various changes may be made in the form, structure and arrangement of components without departing from the spirit of the invention.

Having thus described the various features of the invention, what I claim as new and desire to secure by Letters Patent is:

1. A flowmeter for measuring the mass rate of flow of a fluid stream, comprising:

a housing having a passage located between an inlet port and an outlet port to provide a flow path for said fluid stream;

a drive turbine having a shaft mounted on a support in said passage;

said drive turbine having an end plate secured to said shaft and extending radially substantially to the wall of said passage, said end plate having a plurality of bypass openings radially located round said shaft for permitting said fluid setream to flow therethrough and rotate said drive turbine;

a plurality of blades pivotally hinged to said plate overlying said bypass openings, each of said blades and the associated face of said plate adjacent said bypass openings defining an orifice for permitting flow therethrough to drive said rotatable drive turbine;

resilient means connected to each of said blades and said end plate for urging said blades against the plate around said openings for permitting fluid flow, only through a restriction between said blades and said plate, corresponding to a low flow rate until the pressure differential between said inlet and outlet port reaches a predetermined value sufficient to overcome said resilient means thereby allowing a varying flow rate through said opening dependent upon the pressure differential above said predetermined value;

a reaction turbine freely mounted on said shaft;

yieldable means connected to said shaft and said reaction turbine for transmitting rotation of said drive turbine to said reaction turbine;

said yieldable means in transmitting said rotation causing said reaction turbine to lag said drive turbine by a lag angle which is proportional in magnitude to the mass flow rate of said fluid stream and the angular velocity of said reaction turbine; and sensing means for measuring the lag angle resulting from said low flow rate through said restrictions with said blades against said plate through a progression of flow rates as the resiliently biased blades correspondingly move away from said plate with an increase in fluid flow as the pressure differential between the inlet and outlet ports rises above said predetermined value.

2. The mass flowmeter, as recited in claim 1, wherein each of said blades has a groove located perpendicular to the flow path, said fluid flowing at a low flow rate passing through said groove causing a rotational torque to be created about said shaft.

3. The mass flowmeter, as recited in claim 1, wherein the said end plate has a groove adjacent each of said openings for permitting fluid at a low rate to flow therethrough and cause a rotational torque to said shaft.

References Cited

UNITED STATES PATENTS

| | | | |
|---|---|---|---|
| 2,383,001 | 8/1945 | Mader | 230—114 |
| 2,943,487 | 7/1960 | Potter | 73—231 |
| 3,044,294 | 7/1962 | Wilhelm | 73—231 |
| 3,201,988 | 8/1965 | Liu | 73—231 |
| 3,344,666 | 10/1967 | Rilett | 73—231 |

RICHARD C. QUEISSER, Primary Examiner

C. E. SNEE III, Assistant Examiner

U.S. Cl. X.R.

230—114